United States Patent
Morris

(10) Patent No.: US 9,710,426 B2
(45) Date of Patent: Jul. 18, 2017

(54) COMPUTER SYSTEM AND METHOD FOR SHARING COMPUTER MEMORY

(75) Inventor: Terrel Morris, Garland, TX (US)

(73) Assignee: Hewlett Packard Enterprise Development LP, Houston, TX (US)

(*) Notice: Subject to any disclaimer, the term of this patent is extended or adjusted under 35 U.S.C. 154(b) by 189 days.

(21) Appl. No.: 13/813,243

(22) PCT Filed: Jul. 30, 2010

(86) PCT No.: PCT/US2010/043939
§ 371 (c)(1),
(2), (4) Date: Jan. 30, 2013

(87) PCT Pub. No.: WO2012/015431
PCT Pub. Date: Feb. 2, 2012

(65) Prior Publication Data
US 2013/0132505 A1    May 23, 2013

(51) Int. Cl.
*G06F 15/173* (2006.01)
*G06F 13/16* (2006.01)
*H04L 12/721* (2013.01)

(52) U.S. Cl.
CPC .... *G06F 15/17331* (2013.01); *G06F 13/1657* (2013.01); *H04L 45/62* (2013.01)

(58) Field of Classification Search
CPC ....... G02F 1/395; G06F 12/1036; H04L 26/09
USPC .......... 709/203, 223; 711/103, 204; 710/269
See application file for complete search history.

(56) References Cited

U.S. PATENT DOCUMENTS

| | | | |
|---|---|---|---|
| 6,199,181 B1* | 3/2001 | Rechef | G06F 21/53 |
| | | | 714/38.13 |
| 6,505,275 B1 | 1/2003 | Weissman et al. | |
| 7,149,855 B2 | 12/2006 | Chen et al. | |
| 7,218,862 B2 | 5/2007 | Shahar et al. | |
| 7,231,504 B2 | 6/2007 | Kashyap et al. | |
| 7,437,521 B1 | 10/2008 | Scott et al. | |
| 7,522,836 B2 | 4/2009 | Islam | |

(Continued)

FOREIGN PATENT DOCUMENTS

KR    10-2002-0078172    10/2002
KR    10-2007-0071849    7/2007

(Continued)

OTHER PUBLICATIONS

Free Online Encyclopedia, "SMP," http://encyclopedia2.thefreedictionary.com/p/SMP, 2009, (3 pages).

(Continued)

*Primary Examiner* — Backhean Tiv
(74) *Attorney, Agent, or Firm* — Dierker & Associates, P.C.

(57) ABSTRACT

A computer system has a plurality of computer servers, each including at least one central processing unit (CPU). A memory appliance is spaced remotely from the plurality of computer servers. The memory appliance includes random access memory (RAM). A photonic CPU link is operatively attached to the at least one CPU. A photonic circuit switch is operatively attached to the photonic CPU link. An allocated portion of the RAM is addressable by a predetermined CPU selected from the plurality of computer servers.

20 Claims, 9 Drawing Sheets

(56) References Cited

U.S. PATENT DOCUMENTS

| | | | |
|---|---|---|---|
| 7,966,455 B2* | 6/2011 | Borkenhagen | G06F 12/08 711/128 |
| 2001/0043398 A1* | 11/2001 | Baer | B29C 47/065 359/588 |
| 2001/0047512 A1 | 11/2001 | Szewerenko et al. | |
| 2003/0033384 A1* | 2/2003 | Nishizawa | G06Q 10/02 709/219 |
| 2003/0079008 A1* | 4/2003 | Fujii | H04L 29/06027 709/223 |
| 2003/0219199 A1* | 11/2003 | James | G02B 6/283 385/30 |
| 2004/0028337 A1* | 2/2004 | Vorobeichik | G02F 1/3132 385/50 |
| 2004/0264112 A1* | 12/2004 | Koehler | H05K 7/1457 361/600 |
| 2004/0267897 A1* | 12/2004 | Hill | G06F 9/505 709/217 |
| 2005/0050293 A1 | 3/2005 | Falk et al. | |
| 2005/0172008 A1 | 8/2005 | Claudatos et al. | |
| 2006/0253561 A1* | 11/2006 | Holmeide | H04L 45/48 709/223 |
| 2007/0086432 A1* | 4/2007 | Schneider | H04M 3/5307 370/352 |
| 2007/0086433 A1* | 4/2007 | Cunetto | H04L 12/58 370/352 |
| 2007/0159682 A1* | 7/2007 | Tanaka | H04Q 11/0005 359/320 |
| 2007/0268926 A1 | 11/2007 | Nakagawa et al. | |
| 2008/0104605 A1* | 5/2008 | Steinder | G06F 9/5033 718/104 |
| 2008/0222351 A1* | 9/2008 | Verdiell | G06F 13/4234 711/104 |
| 2008/0270199 A1* | 10/2008 | Chess | G06F 9/505 705/7.26 |
| 2009/0259836 A1* | 10/2009 | Chan | G06F 9/4406 713/2 |
| 2009/0279341 A1 | 11/2009 | Forrest et al. | |
| 2009/0296719 A1 | 12/2009 | Maier et al. | |
| 2009/0300299 A1 | 12/2009 | Saxe et al. | |
| 2010/0322562 A1* | 12/2010 | Barnes | G02B 6/3895 385/59 |
| 2010/0325329 A1* | 12/2010 | Sakai | 710/269 |
| 2011/0055489 A1* | 3/2011 | Reddy | G06F 12/0831 711/141 |
| 2011/0072204 A1* | 3/2011 | Chang | G06F 12/0284 711/103 |
| 2014/0019972 A1* | 1/2014 | Yahalom | H04L 67/1097 718/1 |

FOREIGN PATENT DOCUMENTS

| | | |
|---|---|---|
| TW | 451093 | 8/2001 |
| TW | 452643 | 9/2001 |
| TW | I245880 | 12/2005 |
| WO | WO-2010002411 | 1/2010 |

OTHER PUBLICATIONS

International Search Report, Apr. 29, 2011, PCT Application No. PCT/US2010/043939, Filed Jul. 30, 2010.

Katayama, Y. et al, "Optical Interconnect Opportunities for Future Server Memory Systems," 2007 IEEE 13th Intl Symposium on High Performance Computer Arch, Pub: 2007; pp. 46-50.

Lim, K. et al, "Disaggregated Memory for Expansion and Sharing in Blade Servers," ISCA 2009, Jun. 20-24, 2009, Austin, Texas, pp. 267-278.

Tremaine, R.B. et al., "IBM Memory Expansion Technology (MXT)," IBM J Res & Dev, vol. 45, No. 2, Mar. 2001, pp. 271-285.

* cited by examiner

COMPUTER SYSTEM AND METHOD FOR SHARING COMPUTER MEMORY

BACKGROUND

The present disclosure relates generally to connection of memory appliances for computer systems.

BRIEF DESCRIPTION OF THE DRAWINGS

Features and advantages of embodiments of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
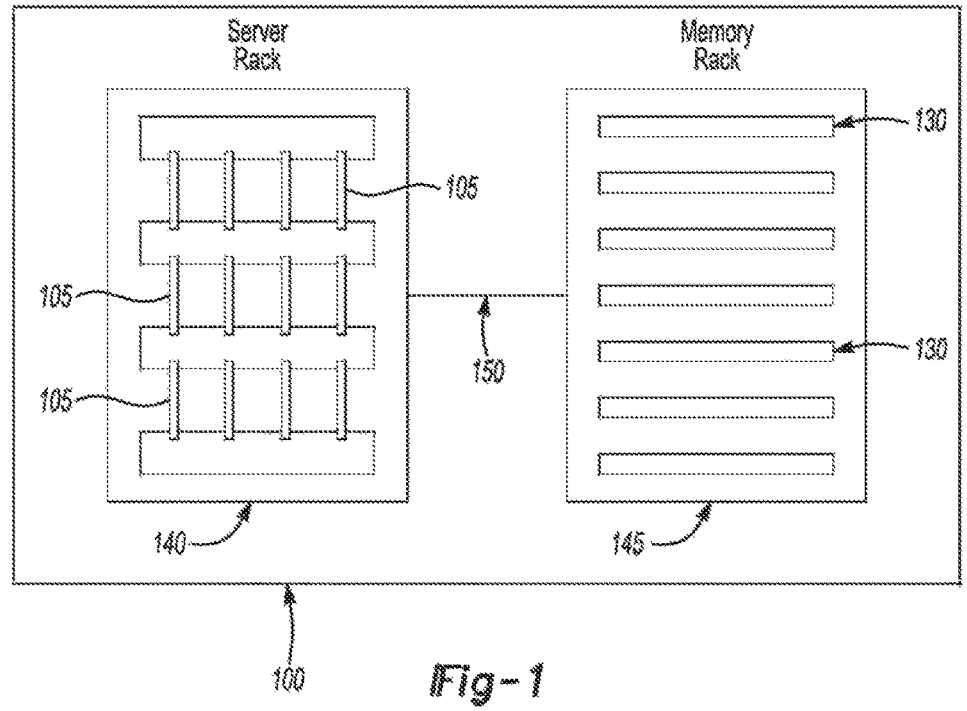
FIG. 1 is a schematic representation of a computer system according to an embodiment of the present disclosure.

A typical central processing unit (CPU) in a computer system may logically address many times the number of memory locations than it can physically control. For example, many CPUs can logically address between 2 TB (2000 GB) and 4 TB (4000 GB) of memory, but can only physically control 12 GB. The fundamental constraints on the number of memory locations are the input/output (I/O) pin count and the power required to directly sustain multiple Double Data Rate (DDR) busses from a single CPU, State-of-the-art CPUs limit their glueless (not using a secondary switching/coherency connectivity hierarchy) connectivity to a domain of 8 processors, and each processor can only control an extreme subset of what it can address. Thus, using processors as Memory controllers may be a relatively expensive means for both addressing and controlling a large amount of memory.

Symmetric MultiProcessing (SMP) is a computer system architecture in which a plurality of CPUs shares the same memory. SMP systems provide scalability. As business increases, additional CPUs can be added to absorb the increased transaction volume. The number of CPUs in SMP systems may range from at least two to more than 32 CPUs.

SMP architectures allow large amounts of memory to be addressed by each CPU by coming many CPUs with a proprietary switching fabric employing a consistent memory coherency scheme over the entire complex. This solution is 1) relatively complex, 2) expensive, 3) adds significant latency, and 4) is not suited to certain applications, including searching.

DDR expansion schemes have also been used to increase memory available to CPUs. An example of a DDR expansion scheme includes Load Reduced Dual in-line Memory Modules (LRDIMMs), LRDIMMs may increase overall server system memory capacity and speed using a memory buffer chip or chips as opposed to a register. The LRDIMM solutions typically increase the controllable amount of memory by single-digit factors, while creating high-power custom DIMMs that may be expensive relative to the value provided.

Another DDR expansion scheme includes chipsets that expand the amount of memory that can be controlled by an existing memory controller. The chipset solutions stretch DDR timing to limits, add power, and do not provide extreme levels of scaling in terms of memory radius. As used herein, the term "memory radius" means an amount of memory that can be attached to a particular entity. Scaling using the chipset solution is limited by the amount of memory that can be packaged with a required proximity to the memory controller.

A drawback of the DDR expansion schemes outlined above is that they cannot be configured for one ratio, and then changed to another ratio at a subsequent configuration event.

Another solution for memory expansion is to build a mainframe computer. Mainframe computers run multiple uses and multiple jobs, and can allocate memory based upon needs. A drawback of mainframe computers is that they are generally expensive, and the total size of the memory expansion is limited.

I/O connected memory may be used as a memory expansion technique. I/O connected memory is expansion memory that connects to servers is software calls to I/O. However, high latency associated with software calls to I/O generally limits the value of I/O connected memory as a solution for memory expansion.

A link-based memory expansion approach uses CPU links to electronically or photonically connect a server to remote memory. However, the connection is point-to-point; thus the link-based memory expansion connects one processor to one memory unit. Link-based memory expansion does not address flexibly sharing a pool of memory resources between multiple servers.

A link-based memory expansion with an electronic packet switch approach overcomes the limitations of the point-to-point network by adding an electronic packet switch. However, a packet switch typically adds tens of nanoseconds of latency and consumes significant power. The high-speed link must be slowed and re-clocked to match the core frequency of the switch, routed, then re-clocked to the high-speed output path. A hierarchy of these switches adds hundreds of nanoseconds of latency, as sequential hops penalize performance.

A computer system with a photonically-attached memory expansion appliance is disclosed herein. Embodiments of the computer system provide the ability to change which memory domains are available to which servers at a configuration event. The system uses a native CPU link to a remote node, and allows adding nodes within the limits of the CPU architecture. The memory that can be attached per node is not fundamentally constrained as described above with memory attached to CPUs, since the CPU links can be allocated to serve many more memory busses per node than per processor. Thus, large amounts of memory may be allocated to a memory intensive process on a CPU for an application (for example, searching a large database), while an application that requires toss memory will have an appropriate amount allocated to it on an other CPU (for example, word processing). On a different occasion, different amounts of memory may be allocated to the CPU and the other CPU. Reconfiguring the memory allocated to a CPU from a pool of memory may be an efficient use of memory.

In contrast, other computer systems may permanently allocate a large amount of memory to each CPU to provide capability to perform memory intensive operations when required, but much of the memory would be under-used during operations that do not require much memory. Costs associated with procurement of the additional memory and power consumption incurred by unused memory are inefficiencies that may be overcome with embodiments of the present disclosure.

Embodiments of the computer system of the present disclosure enable the use of relatively inexpensive, industry-standard servers. The configurable memory resource pool can be allocated to meet customer and application needs. The disclosed computer system may be particularly useful for search applications and cloud architectures.

Referring now to FIG. 1, an embodiment of a computer system 100 is depicted. The computer system includes a server rack 140 and a memory rack 145 having a photonic interconnection 150 therebetween. The server rack 140 includes a plurality of computer servers 105 operatively disposed in the server rack 140. The memory rack 145 includes one or more memory appliances 130. Although FIG. 1 depicts a multi-rack embodiment of the present disclosure, it is to be understood that the memory appliance 130 and computer servers 105 may be housed within the same rack (not shown).

Figure 2:
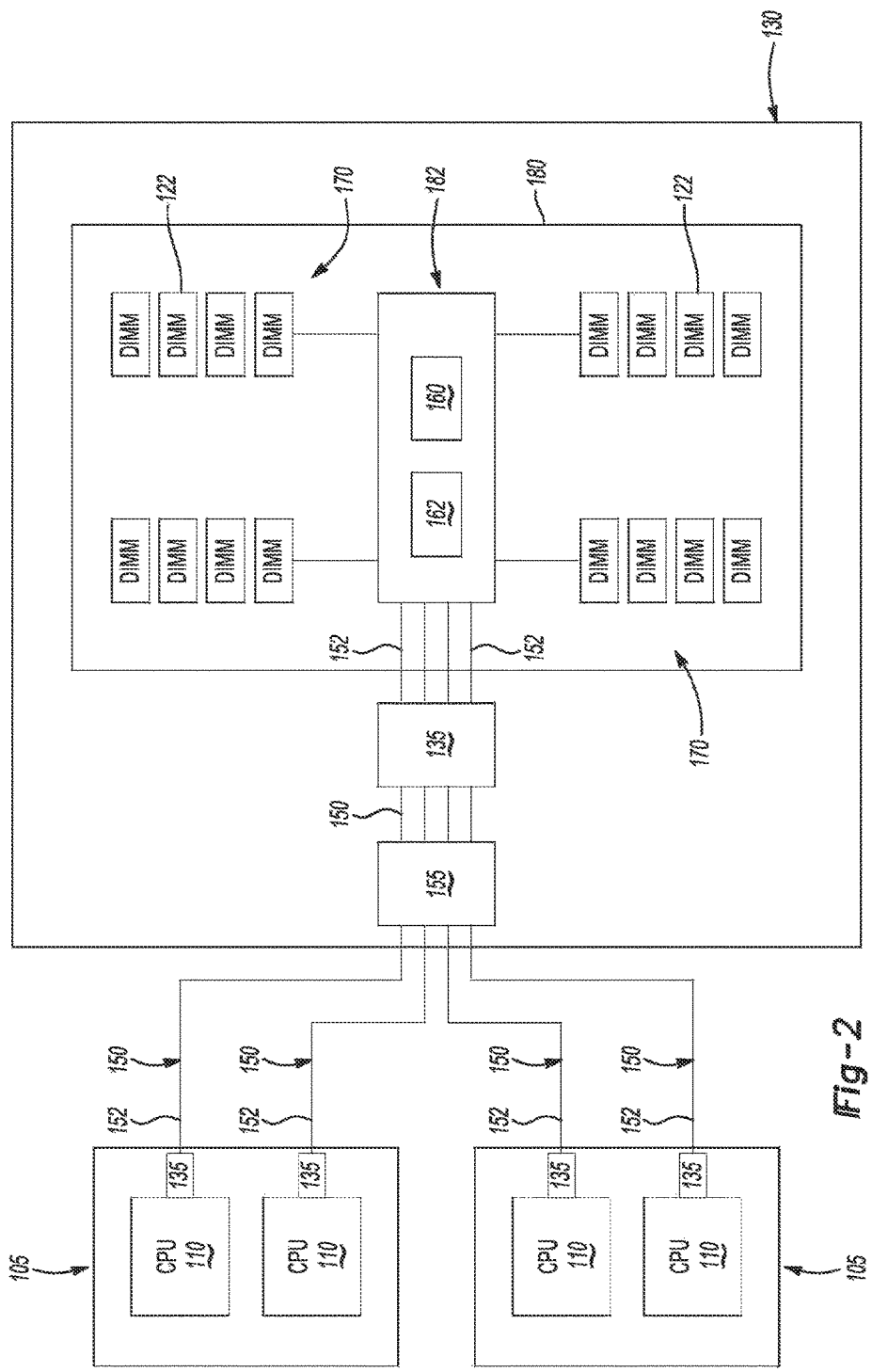
FIG. 2 is a schematic representation of embodiments of additional aspects of the embodiment of the computer system shown in FIG. 1.

FIG. 2 shows further aspects of the embodiment of the computer system 100 depicted in FIG. 1. Each computer server 105 includes at least one central processing unit (CPU) 110 operatively disposed therein. A memory appliance 130 is spaced remotely from the plurality of computer servers 105 and includes a photonic circuit switch 155, and a link attached memory domain 180 operatively disposed therein. It is to be understood that a photonic circuit switch 155 may also be known as a photonic fall-through switch.

The ink attached memory domain 180 includes memory controller 160, random access memory (RAM) 170 and an integrated circuit chip 182 that is configured to function as a memory controller 160 and as a CPU-link-to-DDR communications chip 162 operatively disposed in the memory appliance 130. At least one photonic interconnection 150 connects the plurality of computer servers 105 and the memory appliance 130. A converter 135 may be operatively disposed between the CPU and the photonic interconnection 150 to facilitate bidirectional communication between the CPU 105 that communicates electronically, and the photonic interconnection 150. Further, although FIG. 2 does not show this configuration, it is to be understood that two or more photonic interconnections 150 may connect each CPU 110 to the memory appliance 130 for bandwidth, redundancy, and latency considerations.

In an embodiment, an allocated portion of the RAM 170 is addressable by a predetermined CPU 110 selected from the plurality of CPUs 110 disposed in the plurality of computer servers 105 during a configuration event. The selected CPU 110 may be selected based on many factors, e.g., the programs that need to be executed in the computer, database size, the size of the calculation task, etc. For example, a CPU 110 may be allocated a large portion of RAM 170 to search large databases. In another example, a maximum allocated portion of the RAM 170 addressable by the predetermined CPU 110 is about 100 percent of the RAM 170 operatively disposed in the memory appliance. In yet another example, a ratio of a maximum allocated portion of the RAM 170 to CPU cores 112 is at least about 64 GB/core in the predetermined CPU 110.

In a further example, 90 percent of the RAM 170 may be allocated to the predetermined CPU 110, and all of the remaining CPUs 110 combined may be allocated a remaining 10 percent of the RAM 170 until a subsequent configuration event. At the subsequent configuration event, an alternative predetermined CPU 110 may be allocated 30 percent of the RAM 170 operatively disposed in the memory appliance, while the remainder of the CPUs 110 is allocated 70 percent of the RAM 170 in the aggregate.

It is to be understood that all of the CPUs 110 have some level of native memory. As used herein, portions of the RAM 170 allocated during configuration events are disposed in the memory appliance 130 separate from, and in addition to the native CPU memory.

The allocated portion of the RAM 170 is established and maintained throughout operations of the computer system 100 until a subsequent configuration event. It is to be understood that establishing an allocated portion of RAM 170 means that a particular range (not shown) of memory locations in the RAM 170 are) designated for the exclusive use of a particular CPU 110, and the exclusive allocation does not change, (i.e., is maintained throughout operations) until a subsequent configuration event.

A configuration event may be a boot operation, or similar event determined by the operating system, by hypervisior appliance firmware, or by other control means. Configuration events may also include, but are not limited to instantiation of virtual machines, periodic reconfiguration of the computer system 100 (e.g., for business needs on a monthly, quarterly, yearly, etc. basis), and the like, and combinations thereof.

It is to be understood that, in embodiments of the present disclosure, memory may be assigned to a CPU during any configuration events of the computer system 100, and such assignment is not limited to during a boot or similar configuration event.

It is to be further understood that "configuration events" as used herein generally speaks to time granularity. By way of example, if memory could be allocated on a per-instruction basis, then a configuration mechanism would react within the time expectations for an instruction in the computer system (e.g., nanoseconds). Alternatively, if memory were to be allocated on a per-Virtual-machine instance basis, then the configuration mechanism reacts within the time of a Virtual-machine instance (e.g., microseconds to milliseconds). Configuration events contemplated as being within the purview of the present disclosure are associated with configuration mechanisms (e.g., circuit switches 155 as disclosed herein and the electronic control thereof (see reference numeral 151 in FIG. 8)) that are not as fast as the per-instruction example, but are as fast or faster than the per-Virtual-machine instance example. In an embodiment, a configuration event is executed by a configuration mechanism in about 100 milliseconds or less. In an alternate embodiment, the event execution time ranges from about 50 microseconds to about 100 milliseconds. In other embodiments, the event execution time may be less than 50 microseconds.

As also shown in FIG. 2, the RAM 170 may be in the form of DIMMs 122, which may be organized in a manner related to specific DDR busses. It is to be understood that other forms of RAM 170 may also be used, including but not limited to memory platters, memory cards, stacked DRAM packages, phase-change memory, and memristor-based memory.

Figure 3:
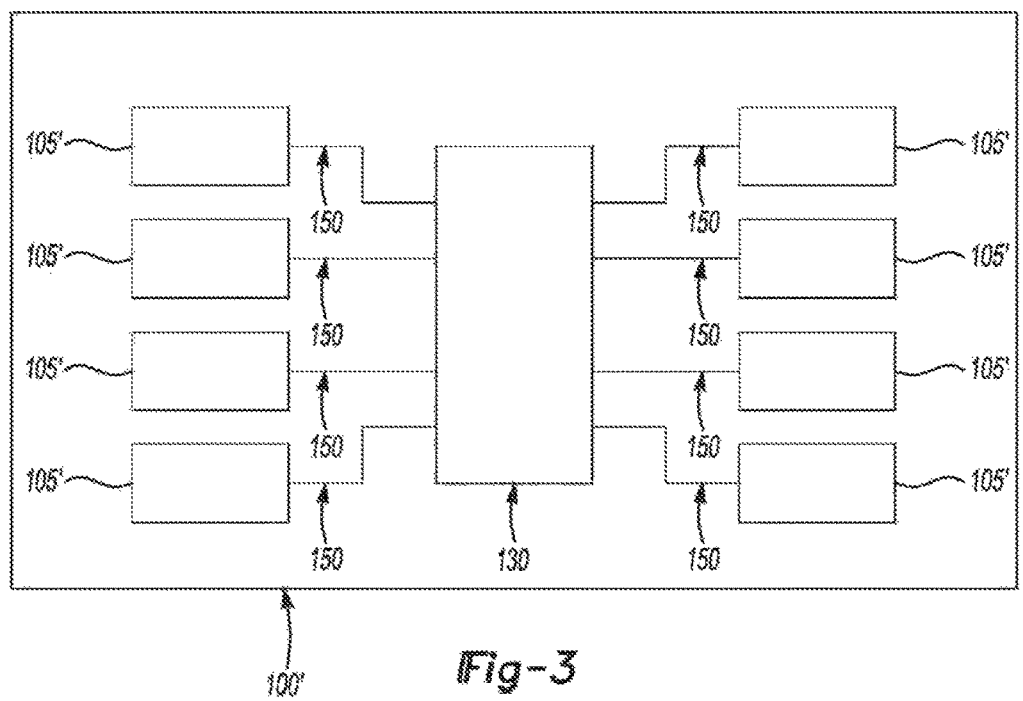
FIG. 3 is a schematic representation of another embodiment of a computer system according to the present disclosure.

Referring now to FIG. 3, an embodiment of a computer system 100' has a plurality of computer servers 105 operatively connected to a memory appliance. 130 via photonic interconnections 150. In the embodiment depicted in FIG. 3, the computer servers 105' are dual-socket servers. It is to be understood that a dual-socket server includes two CPUs 110 (CPUs not shown in FIG. 3 for clarity). It is to be further understood that other embodiments of the computer server may include more CPUs 110 than described above, and other embodiments of the computer system may include more computer servers 105, 105' than shown. For example, in an embodiment, each of the plurality of servers may include more than eight CPUs. In a non-limiting example, a computer system 100, 100' may include 1024 CPUs.

Figure 4:
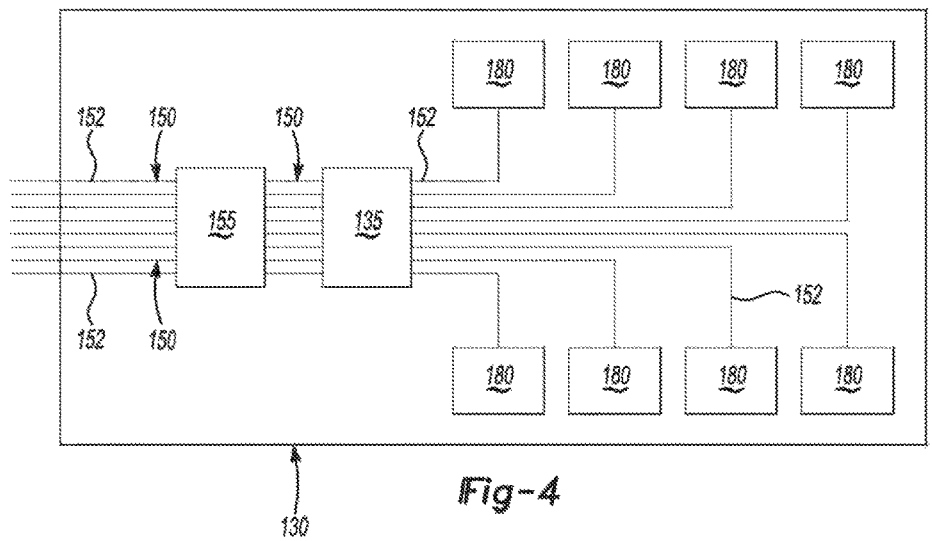
FIG. 4 is a schematic representation of an embodiment of a memory appliance according to an embodiment of the present disclosure.

FIG. 4 depicts the photonic interconnections 150 connecting CPU links 152 to the memory appliance 130. A photonic circuit switch 155 connects the CPU links 152 to link-attached memory domains 180. A converter 135 is operatively disposed between the photonic circuit switch 155 and the link-attached memory domains 180. The converter 135 converts the CPU link signal from a photonic CPU link signal to an electronic CPU link signal. It is to be understood that the converter 135 is bidirectional, therefore converter 135 converts photonic to electronic signals and electronic to photonic signals.

Figure 5:
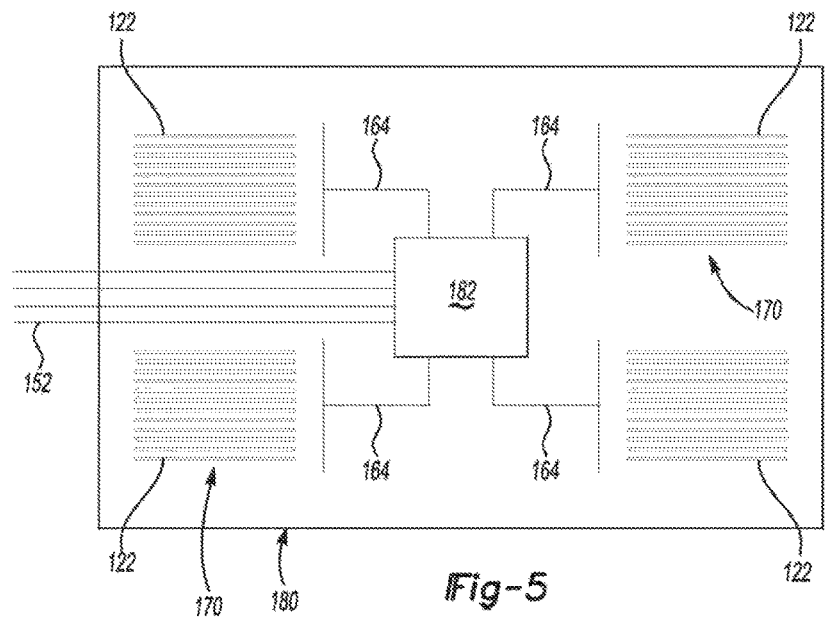
FIG. 5 is a schematic representation of an embodiment of a link-attached memory domain according to an embodiment of the present disclosure.

FIG. 5 shows an individual link attached memory domain 180 including an integrated circuit (IC) chip 182. IC chip 182 is configured to function as a memory controller 160 and as a CPU-link-to-DDR communications chip 162 (as shown in FIG. 2). The DIMMs 122 communicate via a DDR bus 184 thereby completing the path between the CPU 110 and RAM 170 (as seen in FIGS. 2, 4 and 5 together).

Figure 7:
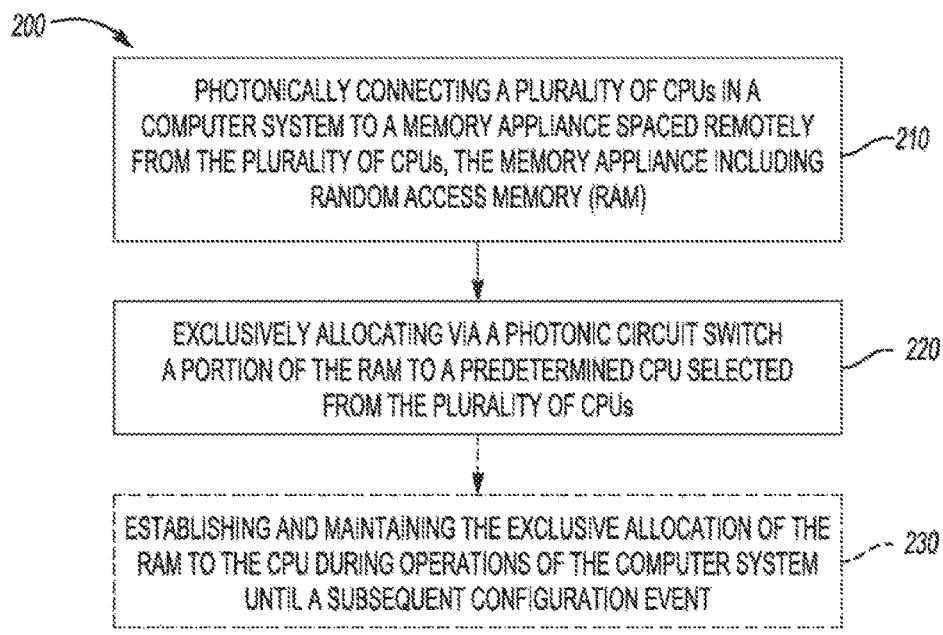
FIG. 7 is a schematic process flow diagram of embodiments of the method of the present disclosure.
Figure 8:
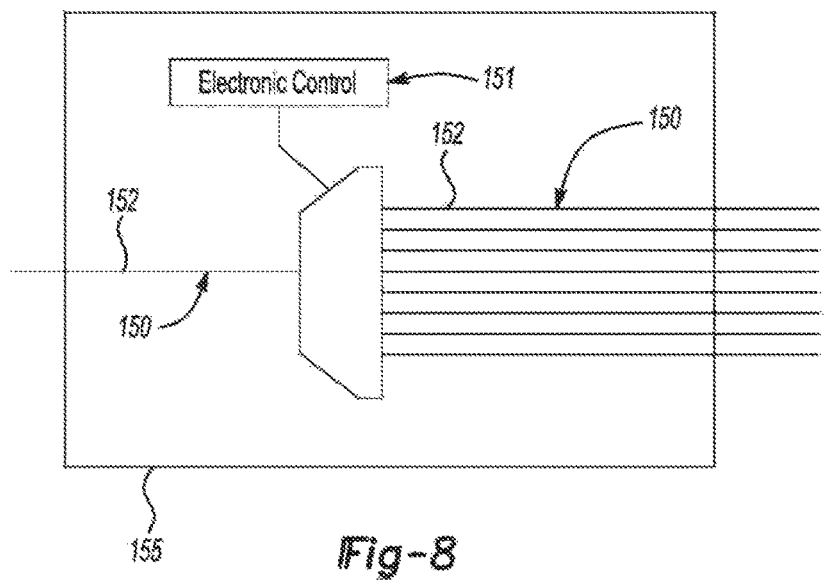
FIG. 8 is a schematic representation of a photonic circuit switch according to an embodiment of the present disclosure.

FIG. 8 schematically depicts photonic circuit switch 155 according to an embodiment of the present disclosure. (It is noted that FIG. 6 and FIG. 7 will be discussed hereinbelow.) As also shown in FIG. 4, photonic circuit switch 155 switches photonic interconnections 150 to connect CPU links 152 with link-attached memory domains 180. As shown in FIG. 8, the photonic circuit switch 155 is electronically controlled, as schematically depicted at reference numeral 151. As such, electronic controls may be changed during configuration events, resulting in changes in connectivity between specific photonic inputs and specific photonic outputs of the photonic circuit switch 155.

Attributes of photonic circuit switches 155 include relatively slow time to switch (typically hundreds of microseconds to tens of milliseconds), but once switched, they have a very short propagation delay time (generally hundreds of picoseconds). In the embodiments herein, the photonic circuit switch 155 switches infrequently relative to the rate of data passing through the switch (when the memory configuration is changed), but once switched, the photonic circuit switch 155 provides very low-latency and high bandwidth communications. In embodiments of the present disclosure, the photonic circuit switch 155 may be configured to have a switch time from about 50 microseconds to about 100 milliseconds. In other embodiments, the switch time may be less than 50 microseconds.

As mentioned above, it is to be understood that memory allocation and reallocation need not be restricted to a boot or similar configuration event, as discussed above. In embodiments of the present disclosure, memory load shifting may be accomplished as a function of changing application demand.

It is to be understood that photonic circuit switch 155 may be provisioned as a MicroElectroMechanical Systems (MEMS) switch, which Uses steeling mirrors to change optical signal connectivity. The photonic circuit switch 155 may also be provisioned as a Liquid Crystal Display (LCD) switch, which uses a power splitter along with an LCD array to block the non-desired optical path. Additionally, Mach-Zehnder Interferometer (MZI) switches, ring modulator switches, and other silicon photonic techniques which provide the ability to selectively route signals may be used. A non-limiting example of a photonic circuit switch 155 may be found in the "intelligent Optical System 100" from Glimmerglass Networks in Hayward, Calif.

It is to be further understood that a photonic circuit switch 155 may include an array or network of photonic circuit switches 155. For example, as used herein, photonic circuit switch 155 may include a linear array of photonic circuit switches. In yet another example, a photonic circuit switch 155 may include a cascade of photonic circuit switches.

Figure 6:
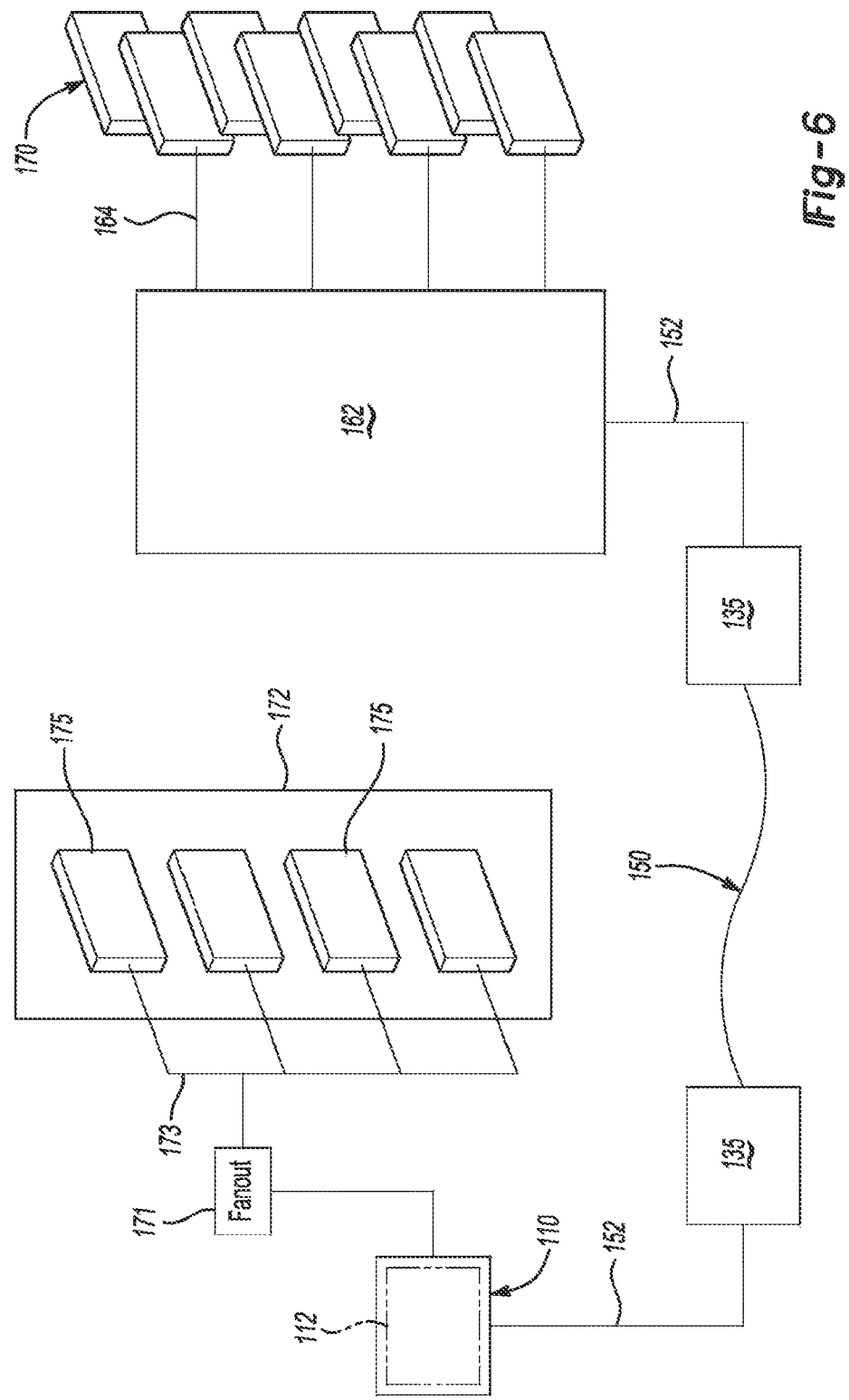
FIG. 6 is a schematic representation of an embodiment of a communications path from CPU to RAM according to an embodiment of the disclosure.

FIG. 6 shows a schematic view of a communications path from a CPU 110 to RAM 170 in an embodiment of the present disclosure. All the CPU is 110 include at least one CPU core 112 (shown schematically in FIG. 6). CPU 110 is connected via fanout 171 on a local bus 173 to memory modules 175 within local memory 172. A CPU link 152 is connected to a converter 135 that converts an electronic CPU link signal to a photonic. CPU link signal that is carried by a photonic interconnection 150 to another converter 135 that converts the CPU link signal from a photonic CPU link signal to an electronic CPU link signal. It is to be understood that as used herein, a photonic interconnection 150 may include more than one optical path. For example, more than one optical fiber (not shown) may be included in photonic interconnection 150. It is to be further understood that the communication across the photonic interconnection 150 may be bidirectional (i.e., one optical fiber communicates in one direction, and another optical fiber communicates in an opposite direction), therefore the converters 135 convert photonic to electronic signals and electronic to photonic signals. CPU-link-to-DDR communications chip 162 connects the CPU links 152 to RAM 170 via DDR bus 164. It is to be understood that the photonic interconnection 150 may include a light transmitting (optical) fiber, couplings (not shown), an converters 135.

Photonic interconnection 150 allows RAM 170 to be located at a greater distance from the CPU 110 (compared to electronic interconnection) without high transport delay times associated with multiple-chip hops and with excellent signal to noise properties. It is to be understood that the product of the speed of light and the length of the fiber continues to be a source of transport delay, but not a significant transport delay at the communication radius disclosed herein. Thus, an embodiment of the disclosure may have a communication radius ranging from about 1 meter to about 10 meters. As shown in FIG. 1, this communication radius allows the memory appliance(s) 130 to be disposed in a memory rack 145 spaced apart from a server rack 140 without performance issues related to transport time until the length of the fiber is such that the product of the speed of light and the length of the fiber becomes a significant part of the delay. The communication radius disclosed in the present disclosure may be one or two orders of magnitude greater than a DDR2 or DDR3 communication radius.

Figure 9:
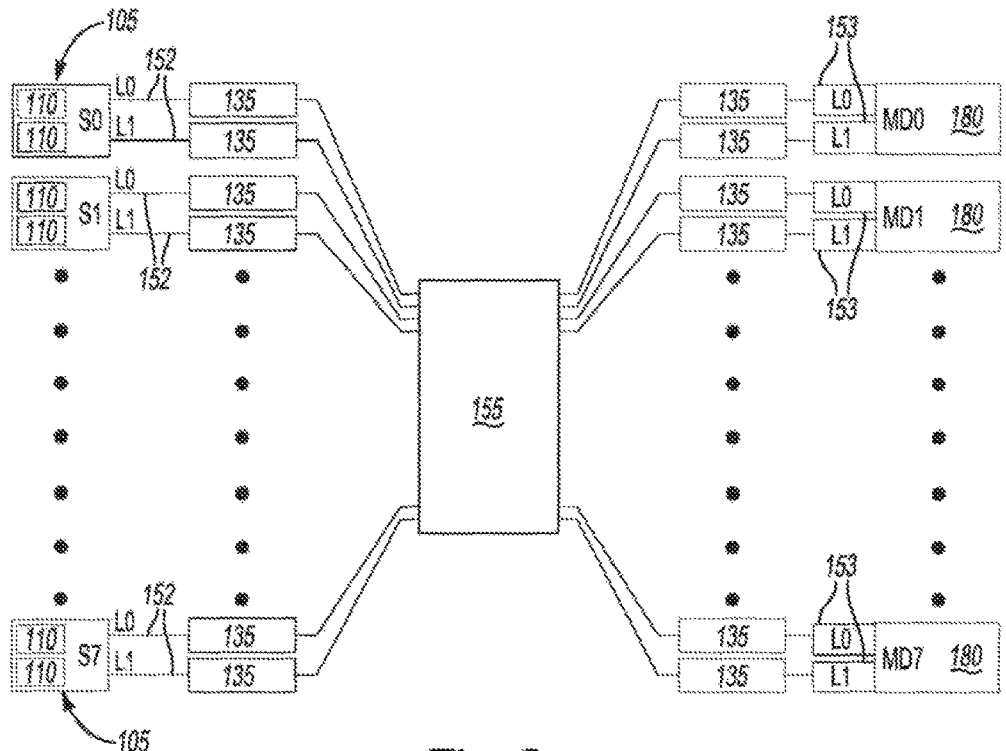
FIG. 9 is a schematic representation of an embodiment of a photonic circuit switch connecting severs and memory according to an embodiment of the present disclosure.

In the embodiment depicted in FIG. 9, an example system implementation connects 8 servers 105 each having two CPU links 152 to a photonic circuit switch 155 serving 8 link-attached memory domains 180. As also depicted in FIG. 4, converters 135 are operatively disposed between the photonic circuit switch 155 and the link-attached memory domains 180. The converters 135 convert the CPU link signals from photonic CPU link signals to electronic CPU link signals. It is to be understood that the converters 135 convert photonic to electronic signals and electronic to photonic signals. It is to be further understood that converters 135 shown on the left side of the photonic circuit switch 155 in FIG. 9 facilitate bidirectional communication between the CPU links 152 that communicate electronically; and photonic circuit switch 155 that communicates photonically.

In FIG. 9, each server 105 has a label S0, S1, . . . S7. Each server 105 has two CPU links 152 labeled L0, and L1. Thus, reference to a particular CPU link 152 of the 16 CPU links 152 shown in GIG. 9 may be accomplished by calling out the server label and the link label (e.g. S0L0, S0L1, S1L0 . . . S7L1). In an explanatory example, the CPU link 152 with the label S1L1 indicates that the respective CPU link 152 is attached to Server 1, Link 1. Each CPU link 152 is a full bi-directional CPU link. It is to be understood that a bi-directional CPU link has the following characteristics: all server outputs are routed to switch inputs, all server inputs are routed to switch outputs, all memory domain inputs are routed to switch outputs, and all memory domain outputs are routed to switch inputs, in the embodiment shown in FIG. 9, each of the 8 servers 105 has access to a maximum of 4 link attached memory domains 180, however, it is not necessary for a server to be attached to any of the memory domains 180.

Figure 10:
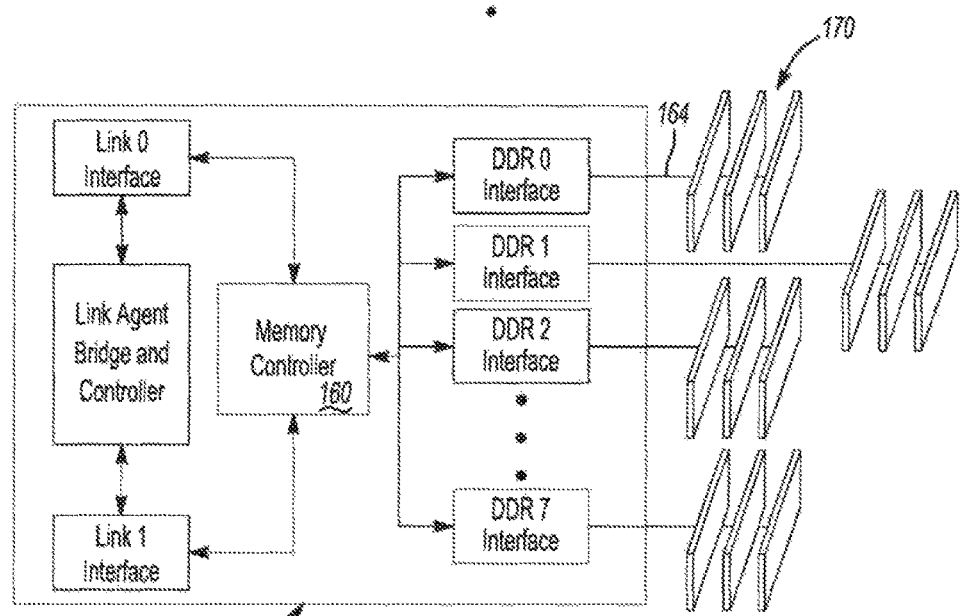
FIG. 10 is a high-level functional block schematic of an embodiment of an integrated circuit chip according to an embodiment of the present disclosure.

FIG. 10 shows a high-level functional block schematic of the integrated circuit chip 182 also shown in FIG. 2. The basic, functionality of the integrated circuit chip 182 includes link control, link bridging, memory control, and DDR physical control functions.

Figure 11:
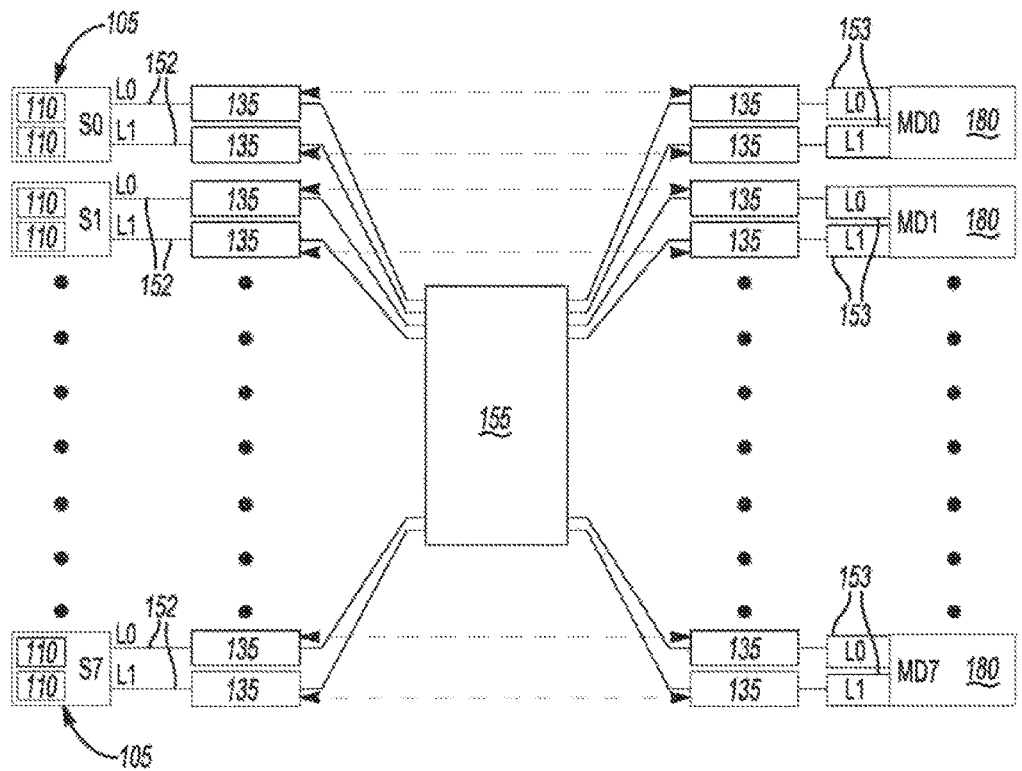
FIG. 11 is a schematic representation of an embodiment of a photonic circuit switch configuration for the embodiment shown in FIG. 9.

Various configurations of attached memory are shown in FIGS. 11-16. FIG. 11 shows a particular switch configuration of the embodiment shown in FIG. 9. In FIG. 11, the CPU links 152 and link-attached memory domain links 153 are mapped in 1:1 correspondence. This configuration provides the highest bandwidth available.

Figure 12:
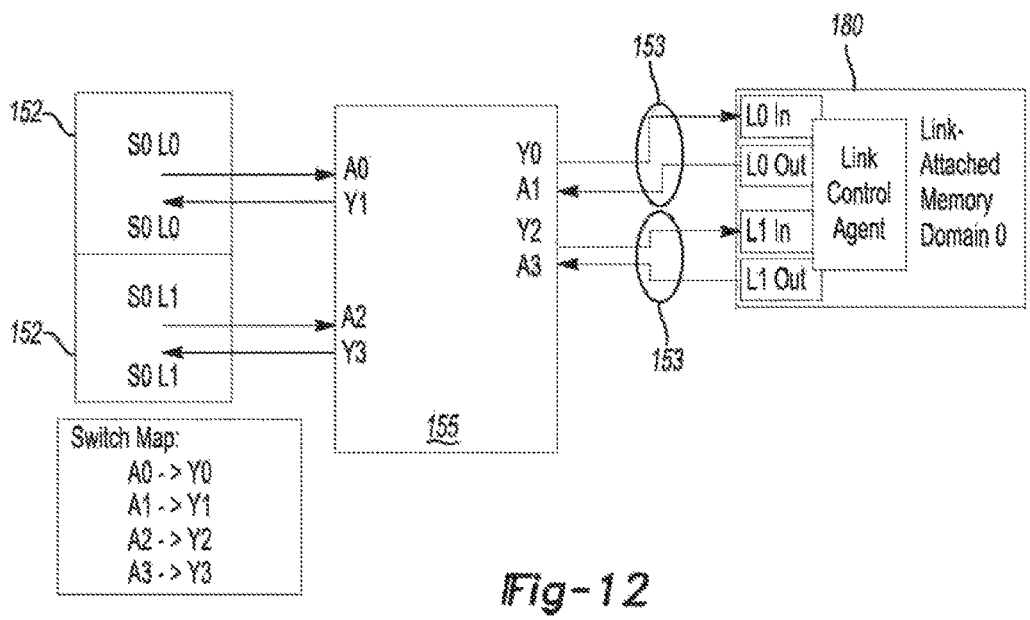
FIG. 12 is a schematic diagram showing an embodiment of photonic circuit switch settings for the embodiment of the photonic circuit switch configuration shown in FIG. 11.

FIG. 12 is a schematic diagram showing exemplary switch settings for the switch configuration shown in FIG. 11. It is to be understood that for simplicity, not all inputs and outputs are shown. For example, the input A0 represents the inputs required for an entire full-width CPU link. As shown in the switch map block, the CPU links 152 and the link-attached memory domain links 153 are mapped in 1:1 correspondence. The links 152, 153 are bi-directional.

Figure 13:
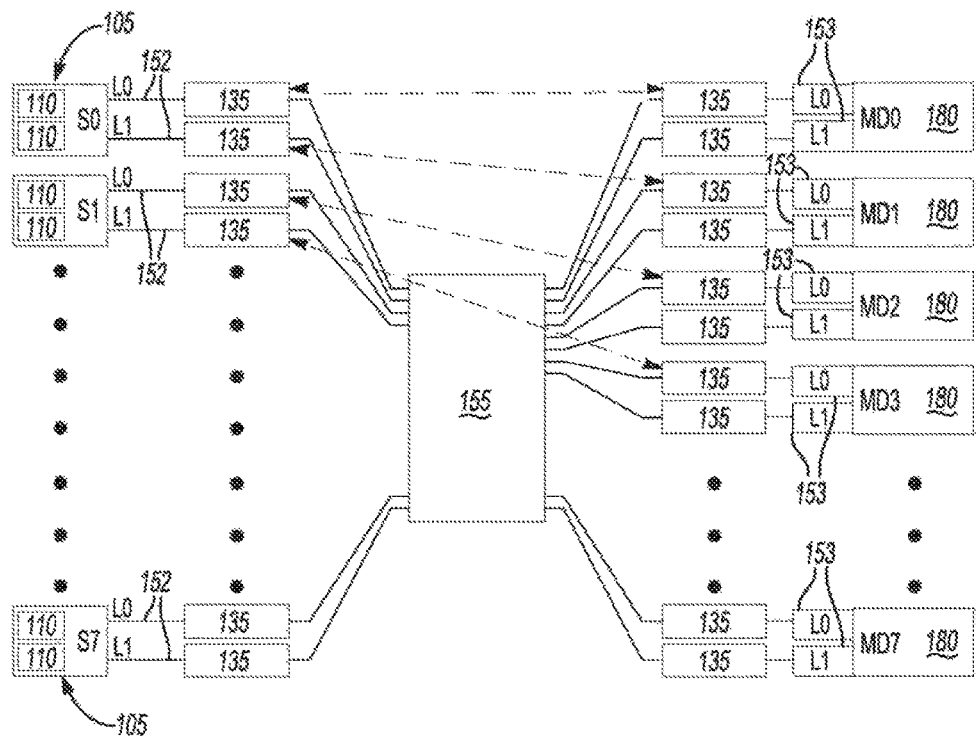
FIG. 13 is a schematic representation of an embodiment of photonic circuit switch configuration for the embodiment shown in FIG. 9.

FIG. 13 shows a moderate connectivity and bandwidth switch configuration of the embodiment shown in FIG. 9. In FIG. 13, two link-attached memory domains 180 are connected to each server 105. This configuration provides medium bandwidth and medium memory radius.

Figure 14:
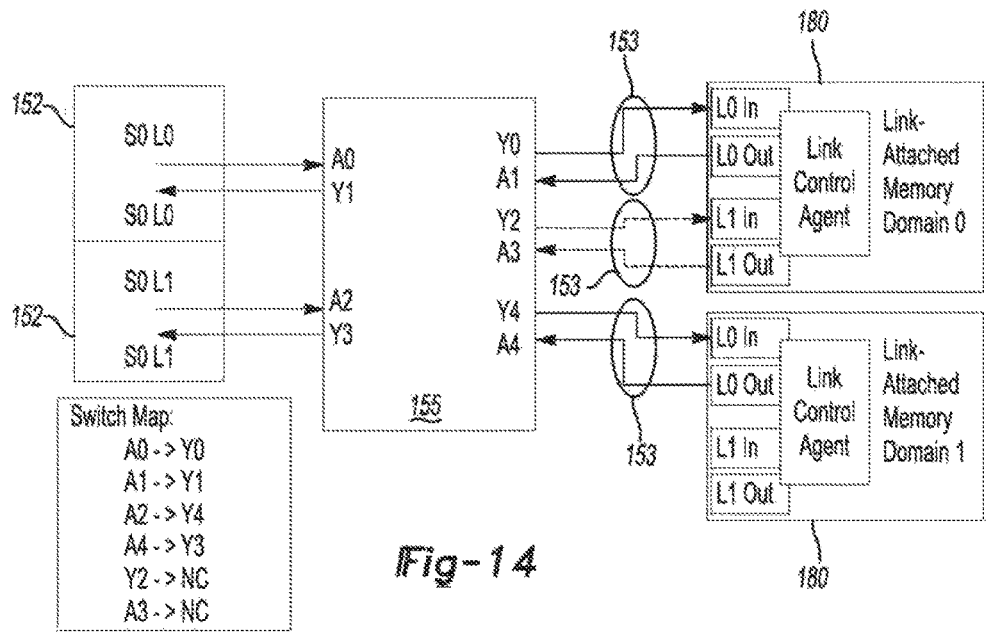
FIG. 14 is a schematic diagram showing an embodiment of photonic circuit switch settings for the embodiment of the photonic circuit switch configuration shown in FIG. 13.

FIG. 14 is a schematic diagram showing exemplary switch settings for the switch configuration shown in FIG. 13. Again, it is to be understood that for simplicity, not all inputs and outputs are shown. For example, the input A0 represents the inputs required for an entire full-width CPU link. As shown in the switch map block, certain link-attached memory domain links 153 are unused. In FIG. 14, dashed lines indicate links that are not connected. Photonic circuit switch 155 output Y2 and input A3 are shown as not connected (NC) in the Switch Map portion of FIG. 14. Links 152, 153 are bi-directional.

Figure 15:
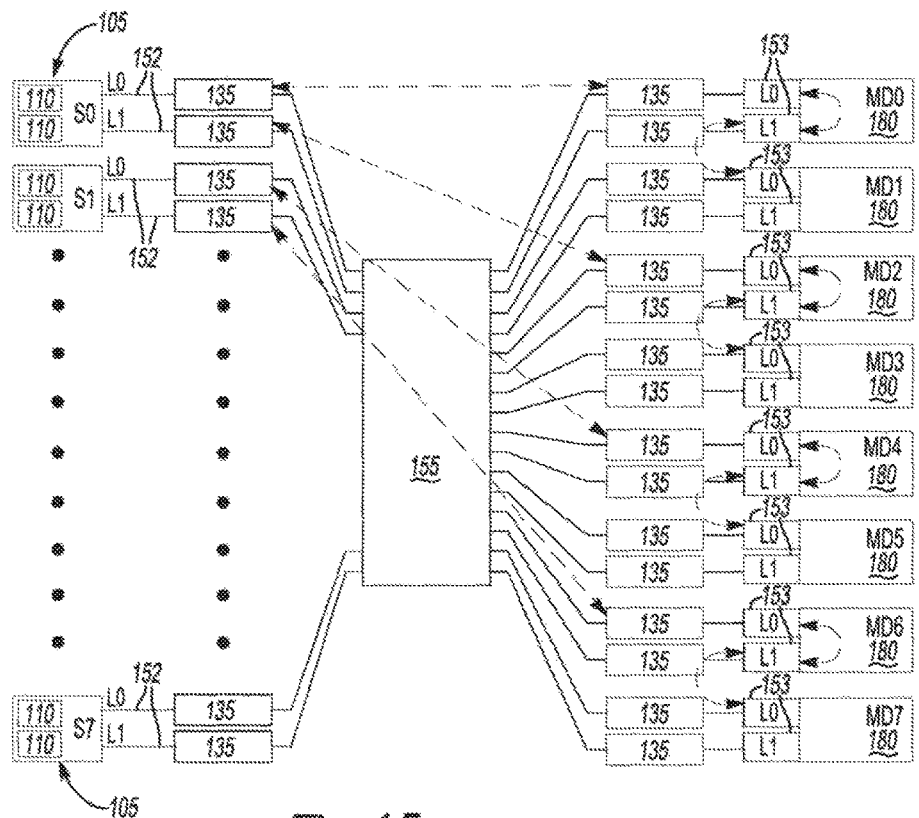
FIG. 15 is schematic representation of an embodiment of a photonic circuit switch, configuration for the embodiment shown in FIG. 9.

FIG. 15 shows a large connectivity and lower bandwidth switch configuration of the embodiment shown in FIG. 9. In FIG. 15, four link-attached memory domains 180 are connected to each server 105. This configuration provides a high memory radius with a lower bandwidth as compared to the configurations shown in FIGS. 11-14.

Figure 16:
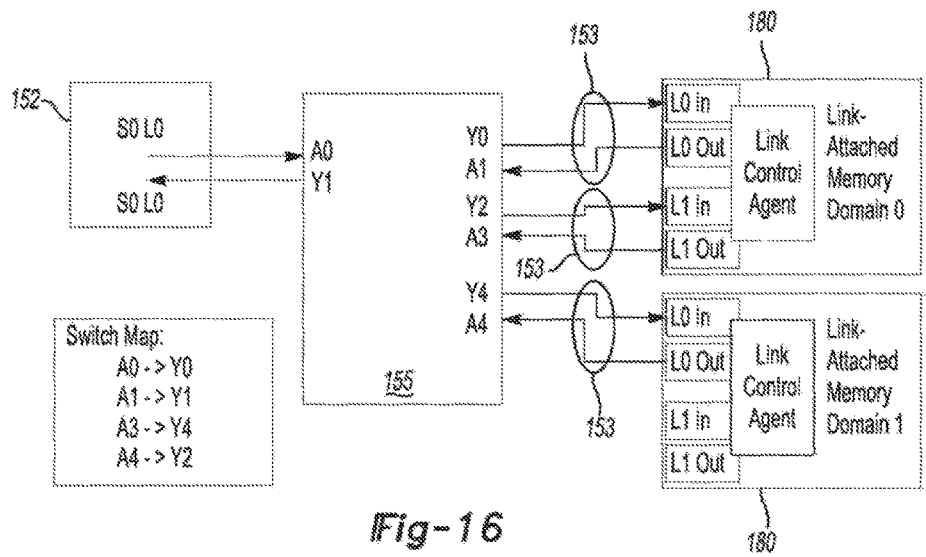
FIG. 16 is a schematic diagram showing an embodiment of photo is circuit switch settings for the embodiment of the photonic circuit switch configuration shown in FIG. 15.

FIG. 16 is a schematic diagram showing exemplary switch settings for the switch configuration shown in FIG. 15. Once again, it is to be understood that for simplicity, not all inputs and outputs are shown. Also for simplicity, only a single CPU link 152 is shown in FIG. 16. As in FIGS. 12 and 14, the input A0 represents the inputs required for an entire full-width CPU link. As shown in the Switch Map block, certain link-attached memory domain links 153 are connected to other link-attached memory domain links 153, thereby providing one CPU link 152 access to two link-attached memory domains 180. Electronic circuit switch 155 input A3 is connected to output Y4 and input A4 is connected to output Y2 in the Switch Map portion FIG. 16. Also shown in FIG. 14, the links 152, 153 are bi-directional.

FIG. 7 depicts a method 200 for sharing computer memory in a computer system having a plurality of Central Processing Units (CPUs). An embodiment of the method 200 includes photonically connections the Plurality of CPUs to a memory appliance spaced remotely from the plurality of CPUs, the memory appliance having random access memory (RAM) operatively disposed there is, depicted at reference numeral 210. Method 200 further includes exclusively allocating, via a photonic circuit switch, a portion of the RAM to a predetermined CPU selected the plurality of CPUs, as depicted at reference numeral 220.

The method 200 may further include establishing and maintaining the exclusive allocation of the RAM to the CPU during operations of the computer system until a subsequent configuration event, as depicted at reference numeral 230.

It is to be understood that as used herein, "spaced remotely" from the plurality of CPUs means the memory appliance(s) 130 are spaced apart from the plurality of CPUs, by a distance ranging from about 1 meter to about 10 meters.

According to the embodiments herein, a total amount of RAM 170 operatively disposed in the memory appliance 130 in Gigabytes divided by a total number of CPU cores 112 in the plurality of computer servers 105 is at least about 64 GB/core (expressed another way, the memory appliance 130 includes a quantity of random access memory (RAM) 170 equal to the mathematical product of 64 GB and the total number of CPU cores 112 in the computer system 100). In another embodiment, the total RAM to CPU core ratio is 256 GB/core, in yet another embodiment, the total RAM to CPU core ratio is 2000 GB/core. It is to be understood that the example total RAM to CPU core ratios above are not intended to imply a uniform allocation of RAM 170 to all of the CPUs 110 in the servers 105 in the computer system 100, although the CPUs 110 may be so uniformly provisioned, if desired. In embodiments disclosed herein, the RAM 170 allocation may be skewed such that a large amount of memory (of the total RAM 170 available) is allocated to one or r core CPUs 110, with the remaining amount of memory (of the total RAM 170 available) being allocated as desired to the remaining CPUs 110.

Each of be plurality of computer servers in the embodiments herein may be dual-socket servers. In another embodiment, the computer servers may include between one and eight CPUs. It is to be understood that more than one CPU may be operatively disposed on a single chip (i.e., dual-core and quad-core processors).

It is to be further understood that embodiments of the present disclosure are not limited to the native capacity provided by a CPU memory controller. For example, a CPU having four DDR busses with four DIMMs each would have a maximum native capacity of 4×4×(DIMM capacity). If the DIMM capacity were 8 GB, the maximum native capacity would be 4×4×8=128 GB. Carrying forward with the same example, if the CPU has 8 cores 112, the memory per core would be 128 GB/8=16 GB. If the CPU in the example were part of an 8-way SMP, the maximum memory would be 1024 GB but the RAM to CPU core ratio would still be 16 GB/core.

In another example of memory limited by the native capacity of the CPU memory controller, a Beckton CPU having 8 cores can control 16 DIMMs. If the DIMMs are 8 GB DIMMs, then the ratio of RAM to CPU cores is 16 GB/core.

In contrast, embodiments of the present disclosure could make all of the RAM 170 available to a single server 105. As such, if the memory appliance 130 supports 128 DIMMs 122, then the total RAM/CPU core ratio is (128 DIMMs×8 GB/DIMM)/(8 cores/CPU×2 CPUs)=64 GB/core, it is to be understood that if the memory appliance 130 supports more DIMMs 122, the ratio of RAM to CPU cores will be greater.

Further, as mentioned above, in embodiments of the present disclosure, a maximum allocated portion of the RAM addressable by the predetermined CPU is about 100 percent of the RAM operatively disposed in the memory appliance(s) 130. It is to be understood that if the predetermined CPU 110 is allocated 100 percent of the RAM 170 from the memory appliance(e) 130, the remaining CPUs 110 will receive no additional memory from the memory appliance(s) 130 until a subsequent reallocation at a subsequent configuration event.

The RAM 170 may be double data rate (DDR) RAM. Other forms of RAM are also contemplated as being within the purview of the present disclosure, including but not limited to memory platters, memory cards, stacked DRAM packages, phase-change memory, and memristor-based memory.

It is to be understood that the terms "attached/attaches/attaching to" and "Connected/connects/connecting to" are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "attached to" or "connected/ing to" the other component is somehow in operative communication with the other component (notwithstanding the presence of one or more additional components therebetween).

While several embodiments have been described in detail, it will be apparent to those skilled in the art that the disclosed embodiments may be modified. Therefore, the foregoing description is to be considered non-limiting.

What is claimed is:

1. A computer system, comprising:
    a plurality of computer servers, each including at least one central processing unit (CPU);
    a memory appliance spaced remotely from the plurality of computer servers and including link-attached memory domains with random access memory (RAM) therein, wherein the plurality of computer servers are operatively connected to the link-attached memory domains of the memory appliance via photonic connections; and
    a photonic circuit switch controlled by an electronic control during a configuration event to change the photonic connections between the plurality of computer servers and the link-attached memory domains of the memory appliance and to allocate a portion of the RAM, during the configuration event, to a predetermined CPU in the plurality of computer servers based on database size that the predetermined CPU is to search.

2. The computer system as defined in claim 1, wherein the memory appliance is located at a distance ranging from 1 meter to 10 meters from the plurality of computer servers.

3. The computer system as defined in claim 1, wherein the photonic circuit switch is to have a switch time less than 100 milliseconds.

4. The computer system as defined in claim 1, wherein the photonic circuit switch is to have a propagation delay time of between 50 picoseconds and 500 picoseconds.

5. The computer system as defined in claim 1, wherein the photonic circuit switch is selected from a group consisting of MicroElectroMechanical Systems (MEMs) switches, Liquid Crystal Display (LCD) switches, Mach-Zehnder Interferometer (MZI) switches, ring modulator switches, and combinations thereof.

6. The computer system as defined in claim 1, wherein the photonic circuit switch is an LCD switch, and wherein the LCD switch includes a power splitter and an LCD array to block a non-desired path.

7. The computer system as defined in claim 1, wherein the photonic circuit switch is to change the photonic connections less frequently than a rate of data passing through the photonic circuit switch.

8. The computer system as defined in claim 1, wherein the allocated portion of the RAM is addressable by the predetermined CPU selected from the plurality of computer servers, and wherein a ratio of a maximum allocated portion of the RAM to CPU cores is at least 64 GB/core in the predetermined CPU.

9. The computer system as defined in claim 1, further comprising a converter operatively disposed on the memory appliance between the photonic circuit switch and the link-attached memory domains to convert photonic CPU link signals to electronic CPU link signals.

10. The computer system as defined in claim 1, wherein the allocated portion of the RAM is exclusively addressable by the predetermined CPU selected from the plurality of computer servers and wherein an allocation, established during the configuration event, of the portion of the RAM for exclusive use of the predetermined CPU is maintained throughout operations of the computer system until a subsequent configuration event.

11. The computer system as defined in claim 1 wherein the configuration event includes an instantiation of a virtual machine.

12. A method for sharing computer memory in a computer system having a plurality of Central Processing Units (CPUs), the method comprising:
   photonically connecting the plurality of CPUs to a memory appliance spaced remotely from the plurality of CPUs, the memory appliance including link-attached memory domains having random access memory (RAM) therein;
   exclusively allocating via a photonic circuit switch a portion of the RAM, during a configuration event including a boot operation, to a predetermined CPU selected from the plurality of CPUs based on a size of a calculation task that the predetermined CPU is to execute;
   establishing and maintaining the exclusive allocation of the portion of the RAM to the predetermined CPU during operations of the computer system until the configuration event; and
   controlling the photonic circuit switch during the configuration event to change the photonic connections between the plurality of computer servers and the link-attached memory domains of the memory appliance.

13. The method as defined in claim 12 wherein a ratio of a maximum allocated portion of the RAM to CPU cores is at least 64 GB/core in the predetermined CPU.

14. The method as defined in claim 12, wherein allocating the portion of the RAM to the predetermined CPU selected from the plurality of CPUs occurs over a time duration of less than 100 milliseconds.

15. The method as defined in claim 12, wherein a signal propagation time through the photonic circuit switch averages between 50 picoseconds and 500 picoseconds.

16. The method as defined in claim 12, further comprising:
   converting, by a converter operatively disposed on the memory appliance between the photonic circuit switch and the link-attached memory domains, photonic CPU link signals to electronic CPU link signals.

17. The method as defined in claim 12, wherein the configuration event includes an instantiation of a virtual machine.

18. A computer system, comprising:
   computer servers, each server including at least two central processing units (CPUs), each CPU having at least two CPU cores operatively disposed therein;
   a memory appliance including link-attached memory domains having a random access memory (RAM);
   a photonic CPU link operatively attached to each of the at least two CPUs; and
   a photonic circuit switch operatively attached between the photonic CPU link and the memory appliance to provide connections between the computer servers and the link-attached memory domains,
   wherein the photonic circuit switch is controlled by an electronic control during a configuration event to change the connections between the computer servers and the link-attached memory domains of the memory appliance and to allocate a portion of the RAM, during the configuration event, to a predetermined CPU in the computer servers based on database size that the predetermined CPU is to search.

19. The computer system as defined in claim 18, further comprising a converter operatively disposed on the memory appliance between the photonic circuit switch and the link-attached memory domains to convert photonic CPU link signals to electronic CPU link signals.

20. The computer system as defined in claim 18, wherein the allocated portion of the RAM is exclusively addressable by the predetermined CPU during the configuration event, and wherein the allocation, during the configuration event, of the portion of the RAM for exclusive use of the predetermined CPU is established and maintained throughout operations of the computer system until a subsequent configuration event.

* * * * *